No. 771,852. PATENTED OCT. 11, 1904.
E. E. WOLF & W. H. GARRETT.
MACHINE FOR OPENING AND REMOVING THE CONTENTS OF ENVELOPS.
APPLICATION FILED OCT. 28, 1903.
NO MODEL.
13 SHEETS—SHEET 7.

Witnesses
G. Howard Walmsley
Irvine Miller

Inventors
Elmer E. Wolf,
William H. Garrett,
By H. A. Toulmin,
Attorney

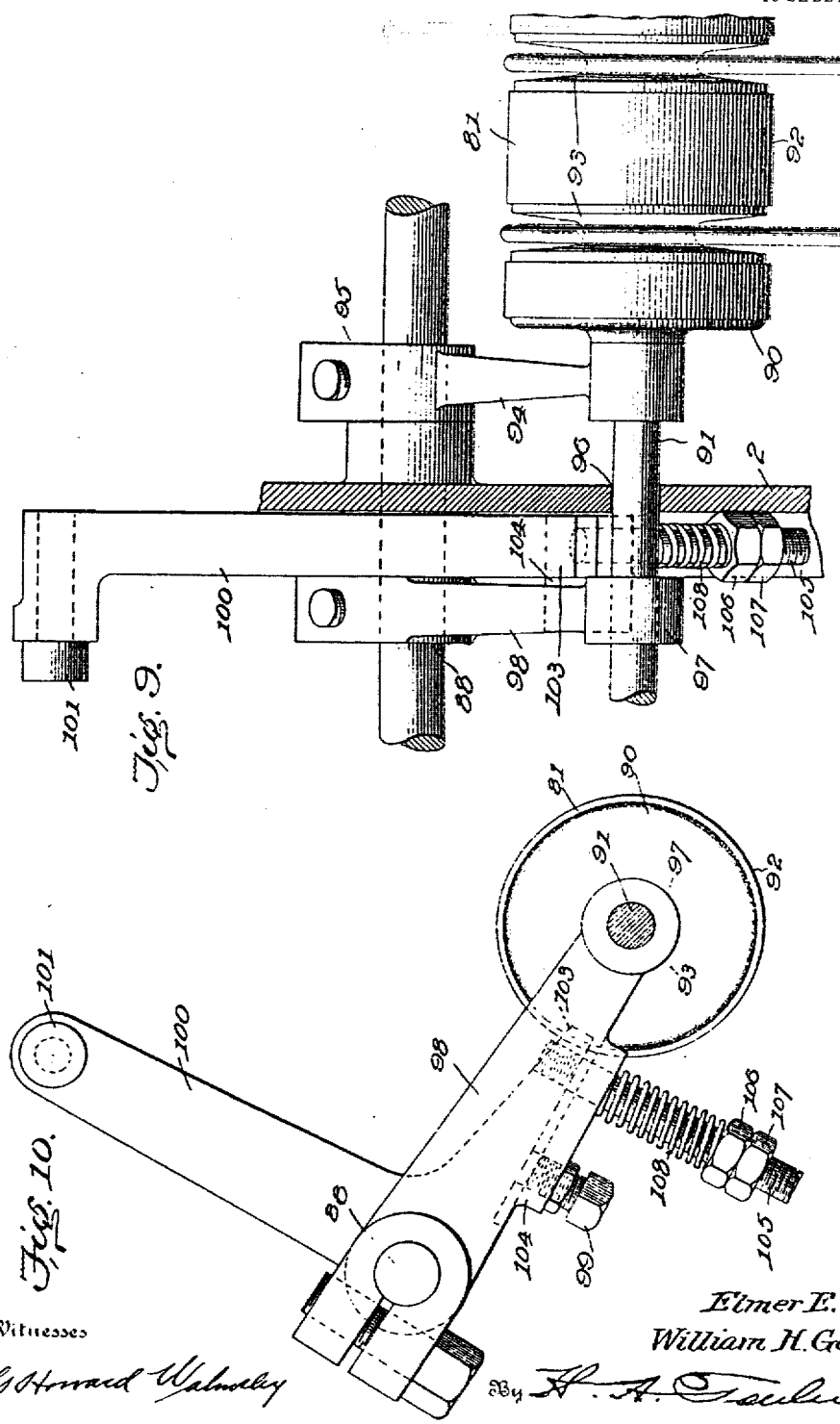

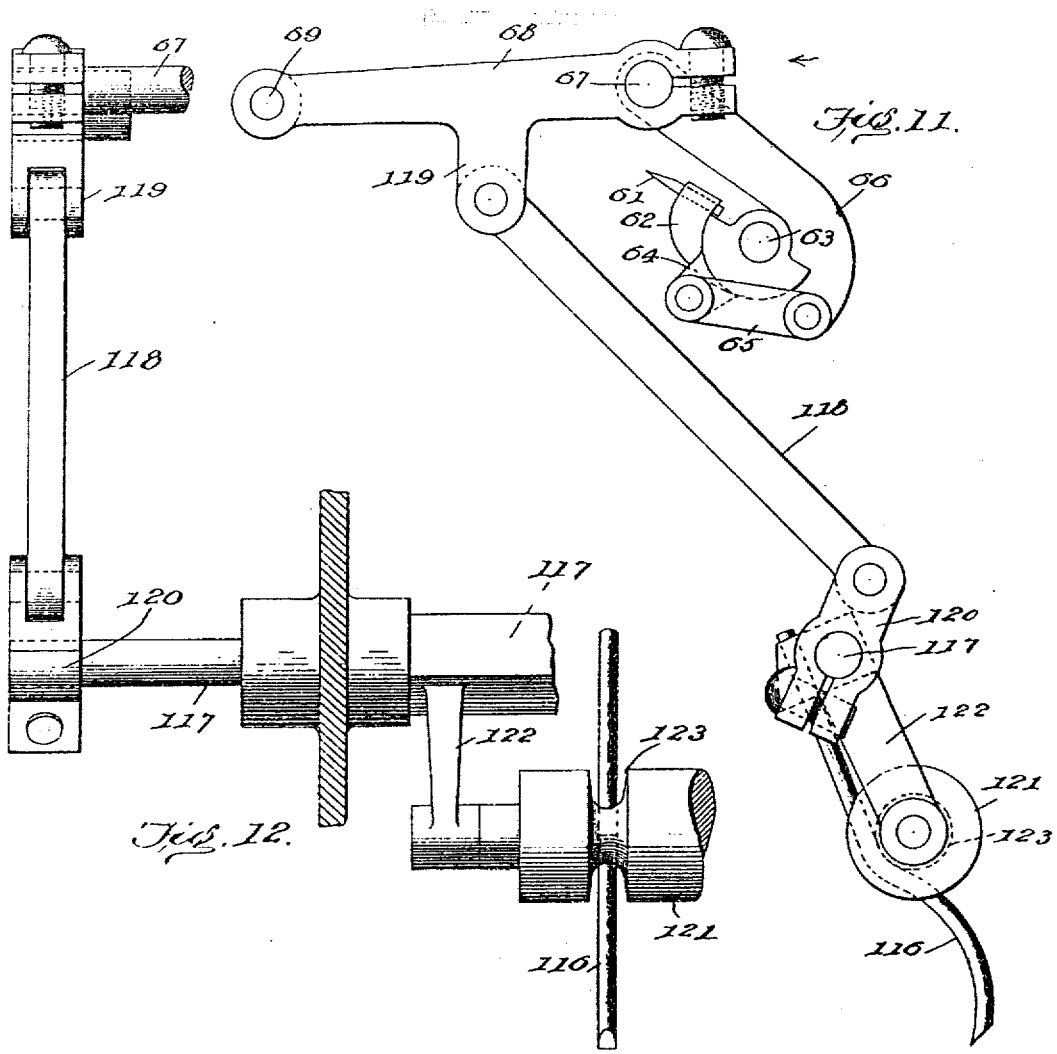

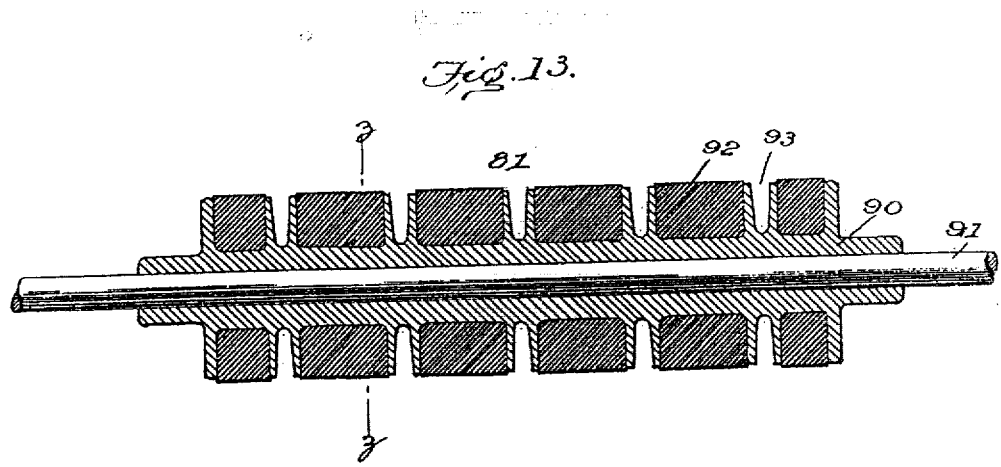
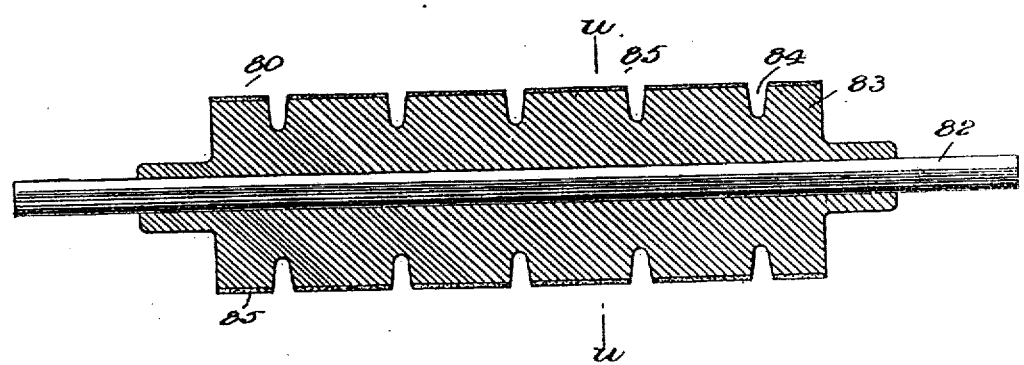
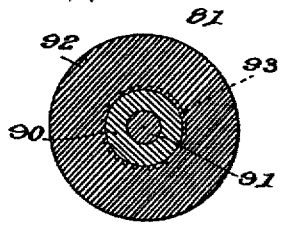
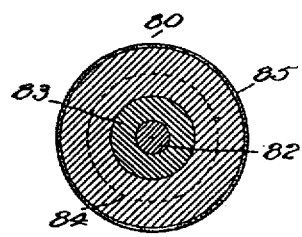

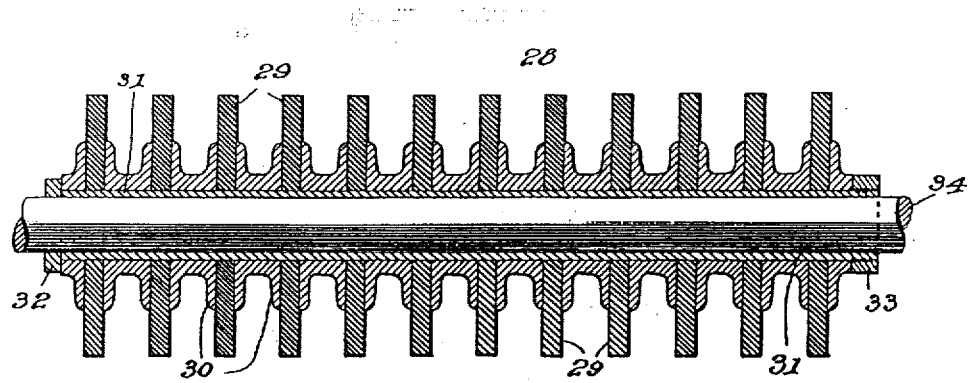
Fig. 17.
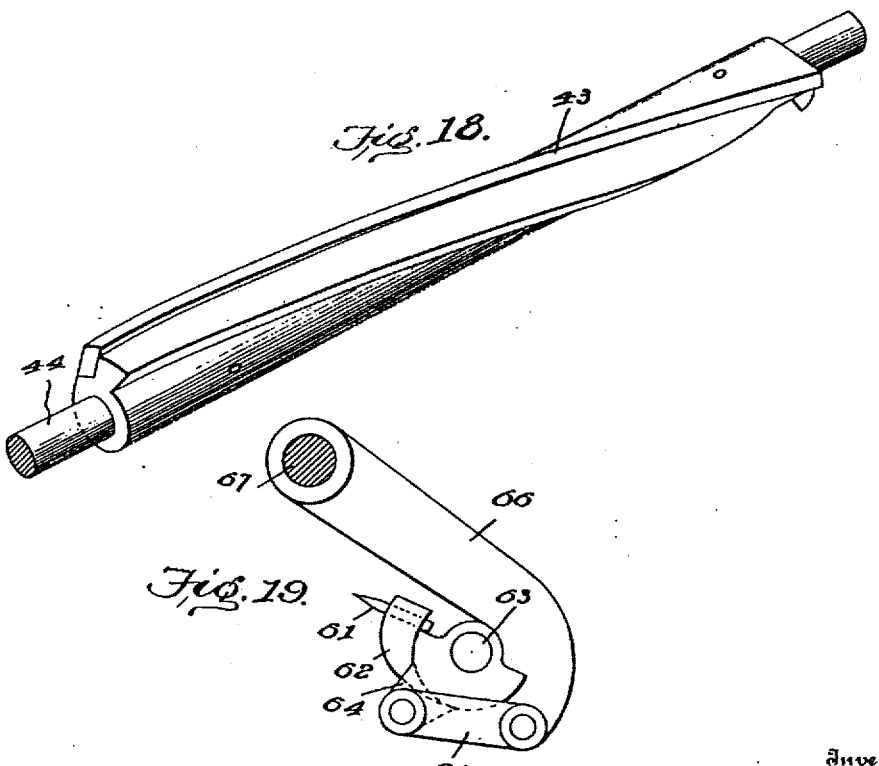
Fig. 18.
Fig. 19.

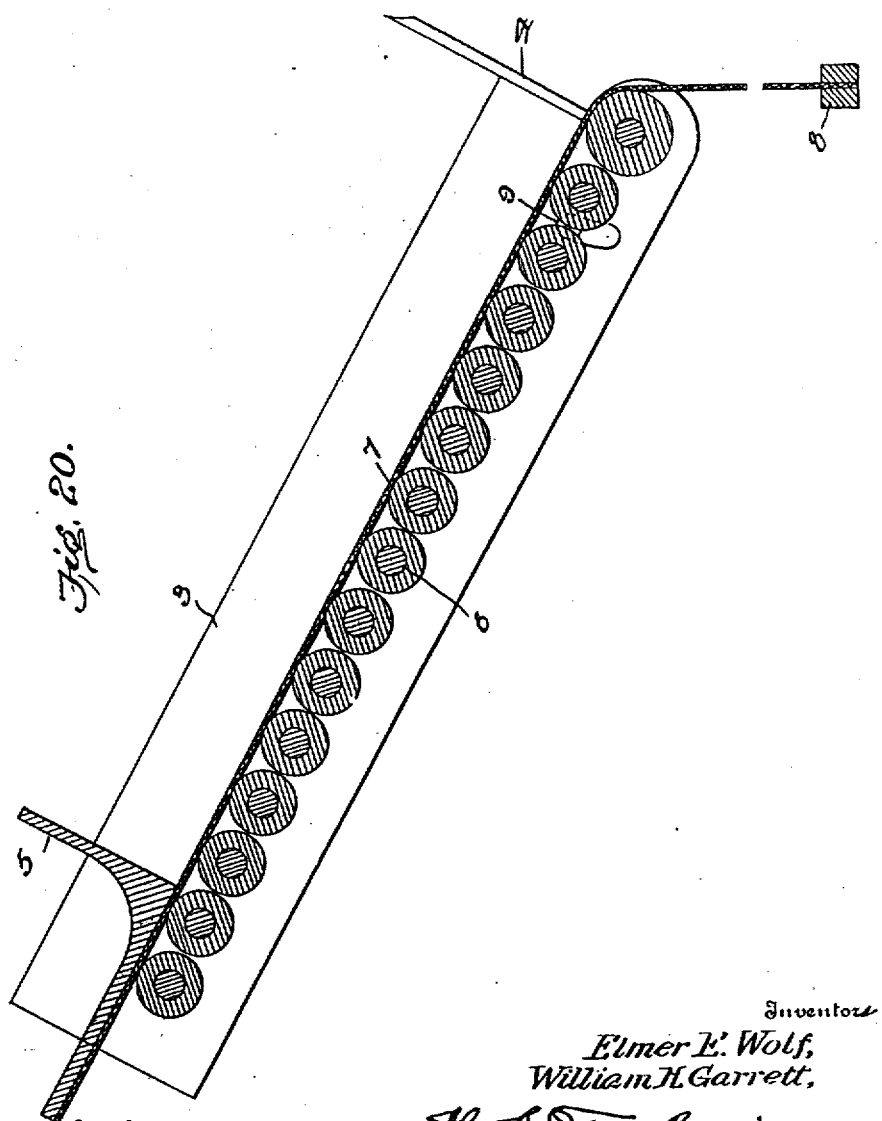

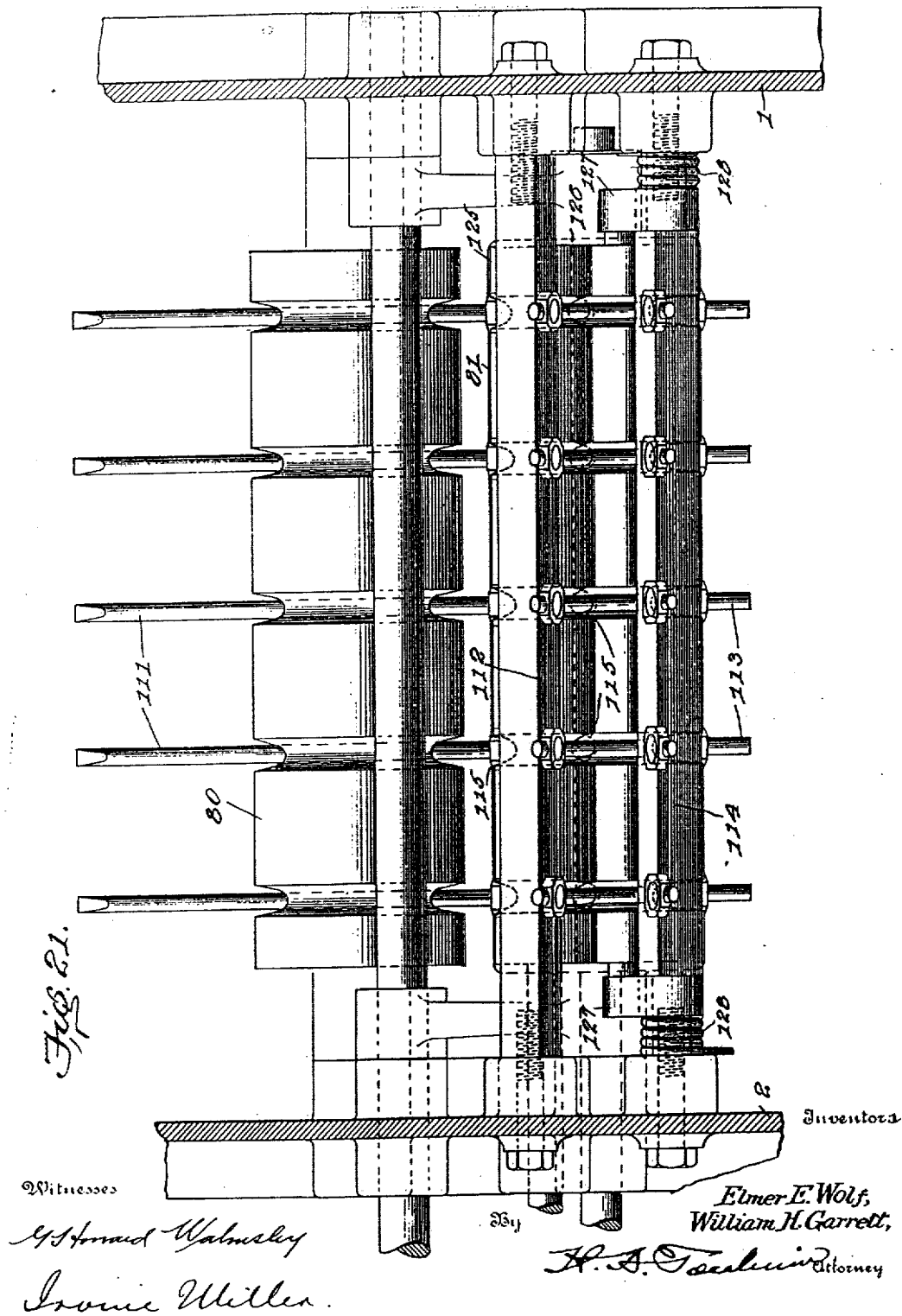

No. 771,852. Patented October 11, 1904.

UNITED STATES PATENT OFFICE.

ELMER E. WOLF AND WILLIAM H. GARRETT, OF SPRINGFIELD, OHIO, ASSIGNORS, BY DIRECT AND MESNE ASSIGNMENTS, TO THE LETTER OPENING COMPANY, OF SPRINGFIELD, OHIO.

MACHINE FOR OPENING AND REMOVING THE CONTENTS OF ENVELOPS.

SPECIFICATION forming part of Letters Patent No. 771,852, dated October 11, 1904.

Application filed October 28, 1903. Serial No. 178,836. (No model.)

*To all whom it may concern:*

Be it known that we, ELMER E. WOLF and WILLIAM H. GARRETT, citizens of the United States, residing at Springfield, in the county of Clark and State of Ohio, have invented certain new and useful Improvements in Machines for Opening and Removing the Contents of Envelops, of which the following is a specification, reference being had therein to the accompanying drawings.

This invention relates to machines for opening and removing the contents of envelops, and has for its object to provide an automatic mechanism whereby envelops may be opened and their contents removed therefrom, the envelops and contents being discharged or delivered at separate points.

It is the chief object of the invention to provide an automatic machine which will perform these operations in a rapid and effectual manner.

As an illustration of one application of the invention we call attention to the money-order business of the post-offices in which large numbers of communications are received at each post-office, each communication consisting of an envelop and one or more inclosed sheets or slips of paper, the envelops being all of the same size and the inclosed slips or sheets being also all of the same size. In post-offices of any considerable importance such communications are daily received by the hundred and by the thousand, and a large portion of the time of one or more employees is devoted solely to the work of opening these envelops and removing their contents. The present machine is devised, primarily, for the purpose of doing this work in a rapid and efficient manner; and to this end our invention consists in certain novel features, which we will now proceed to describe and will then particularly point out in the claims.

Figure 1:
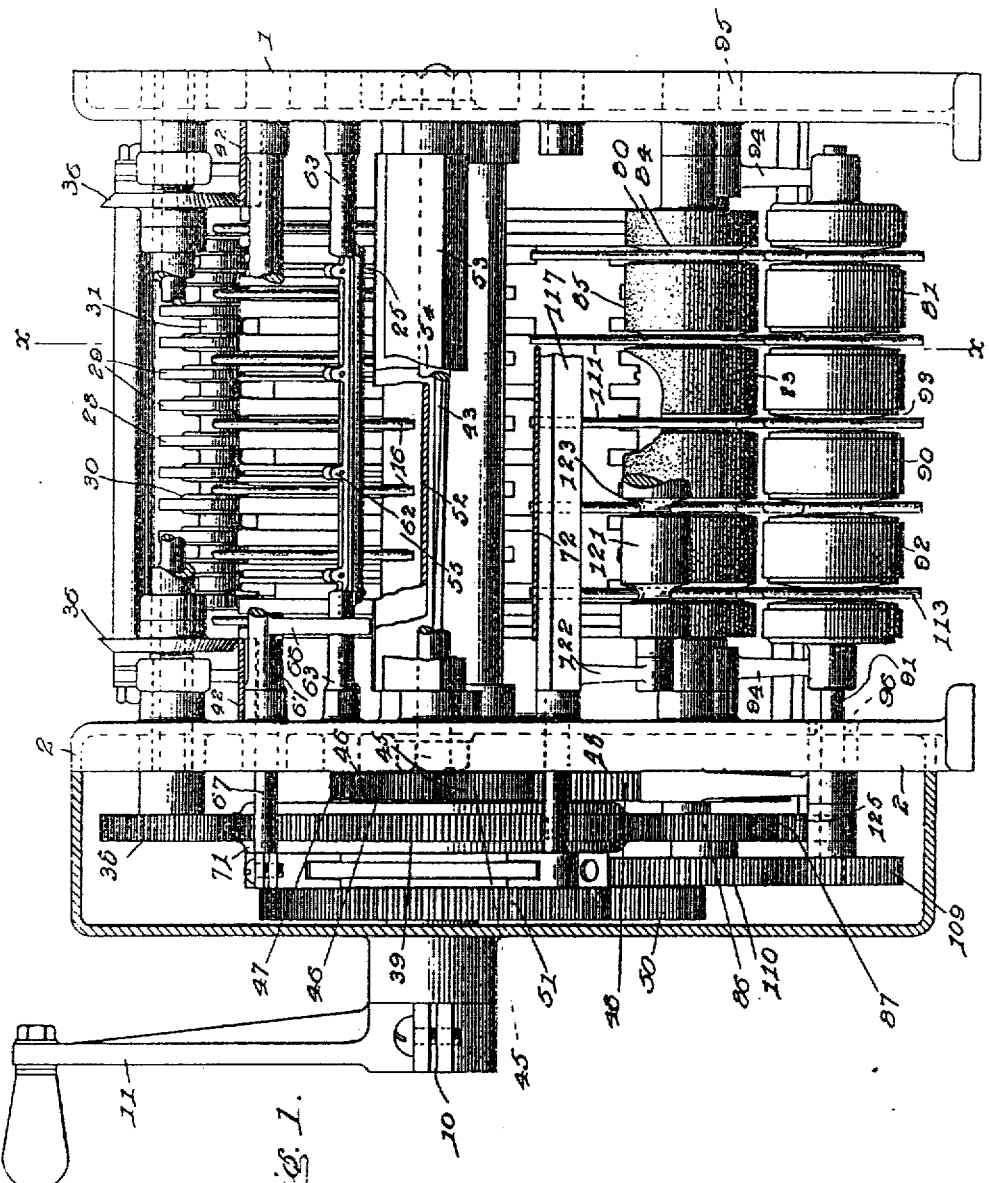
Figure 2:
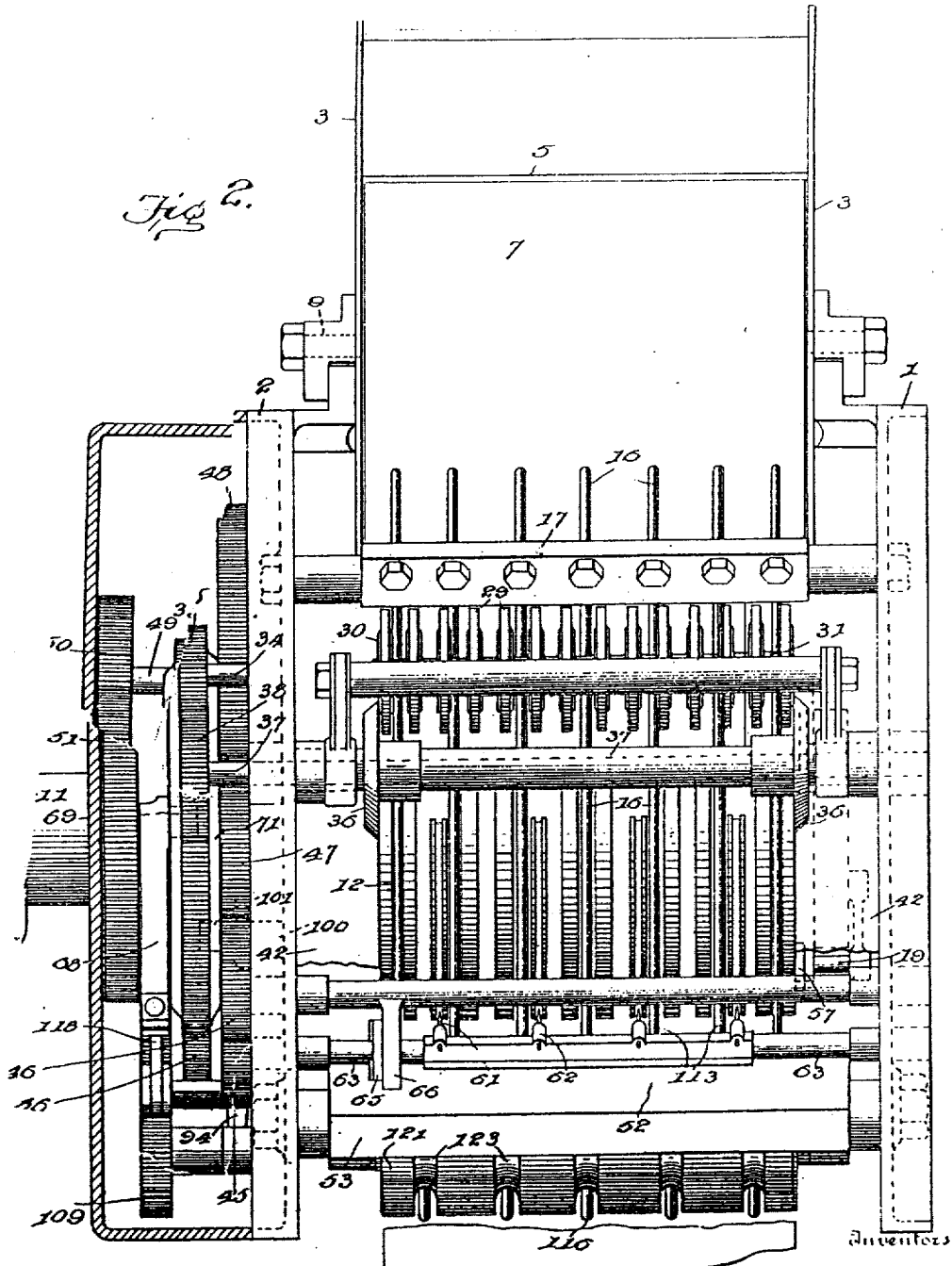
Figure 3:
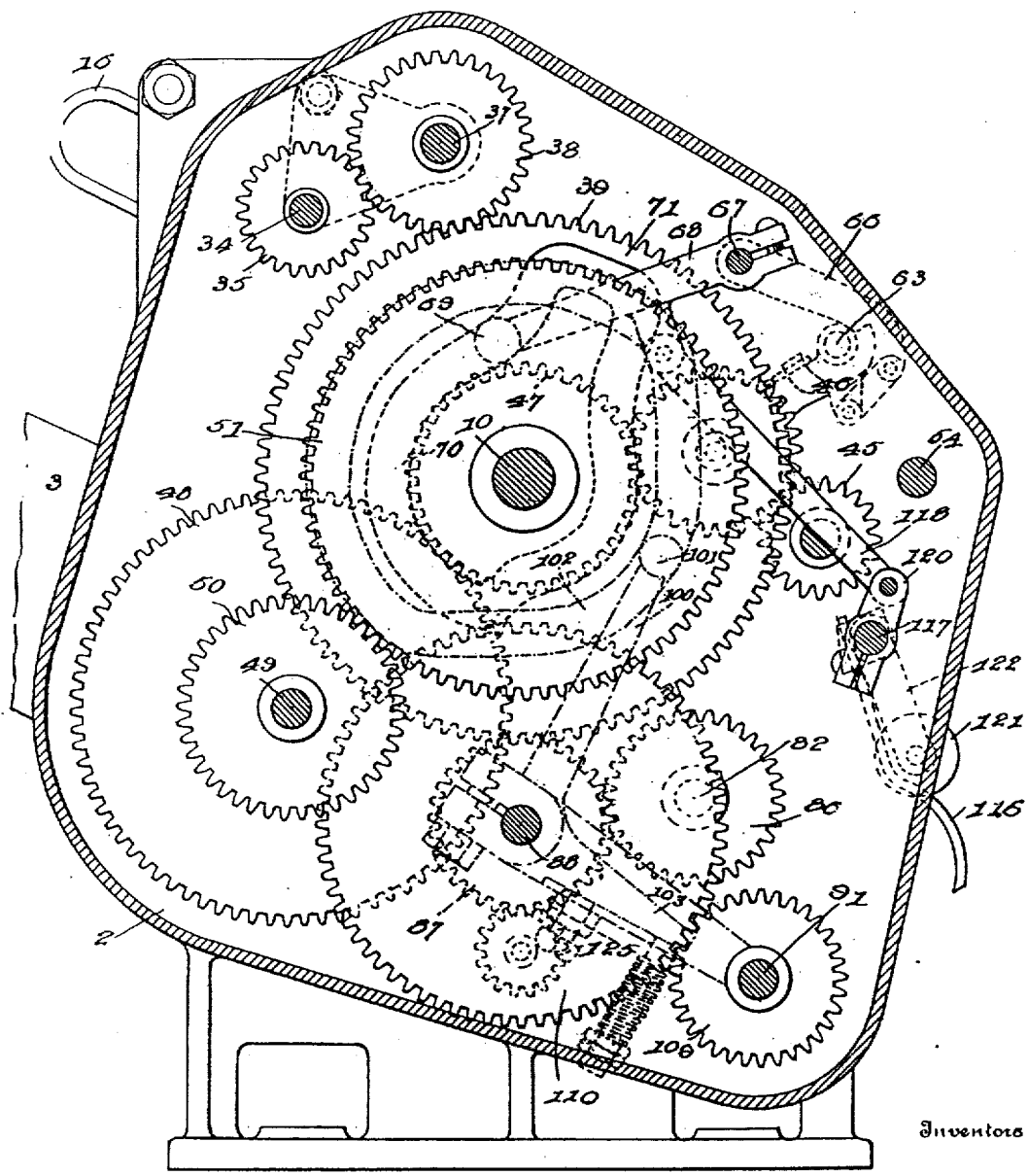
Figure 4:
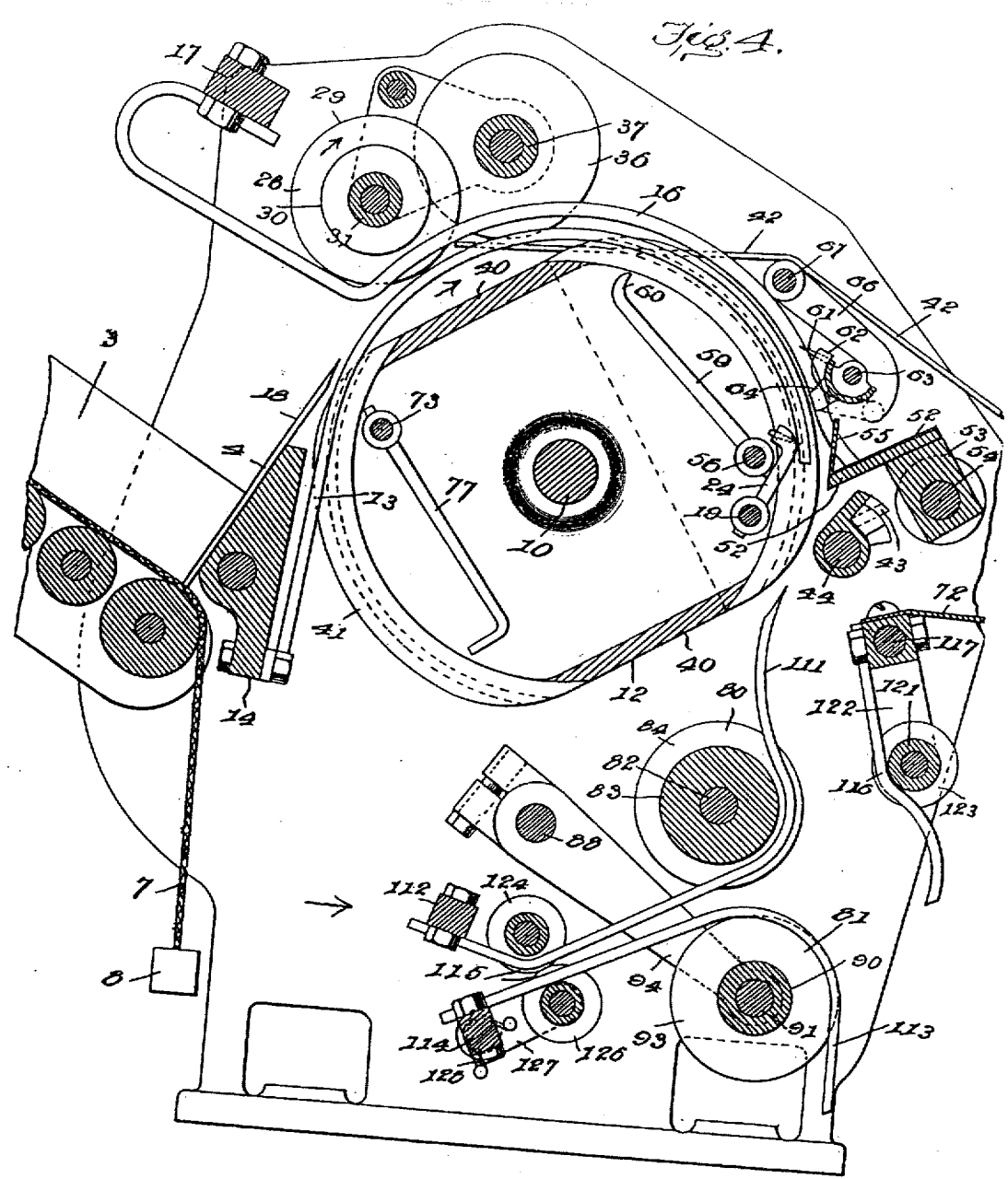
Figure 5:
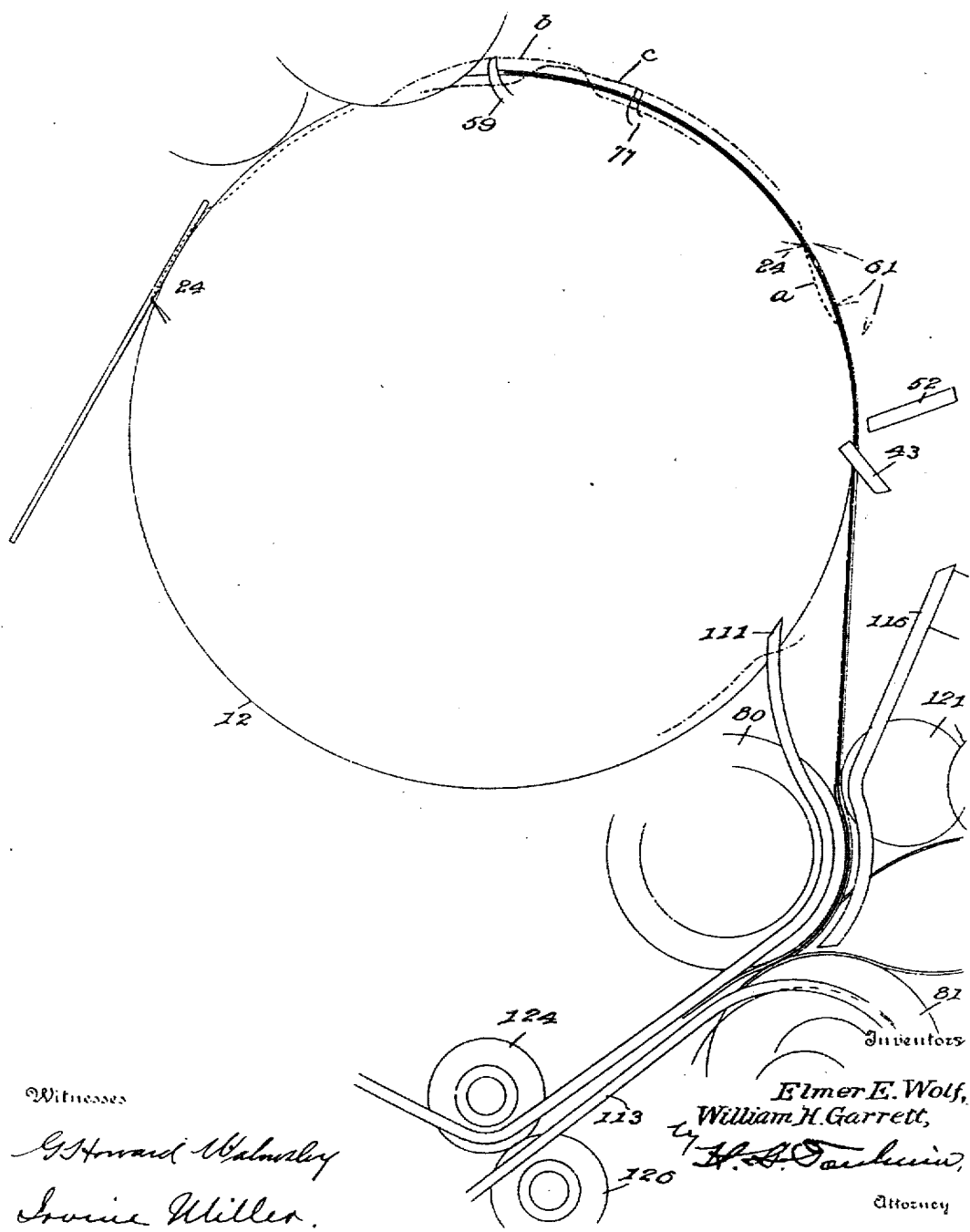
Figure 6:
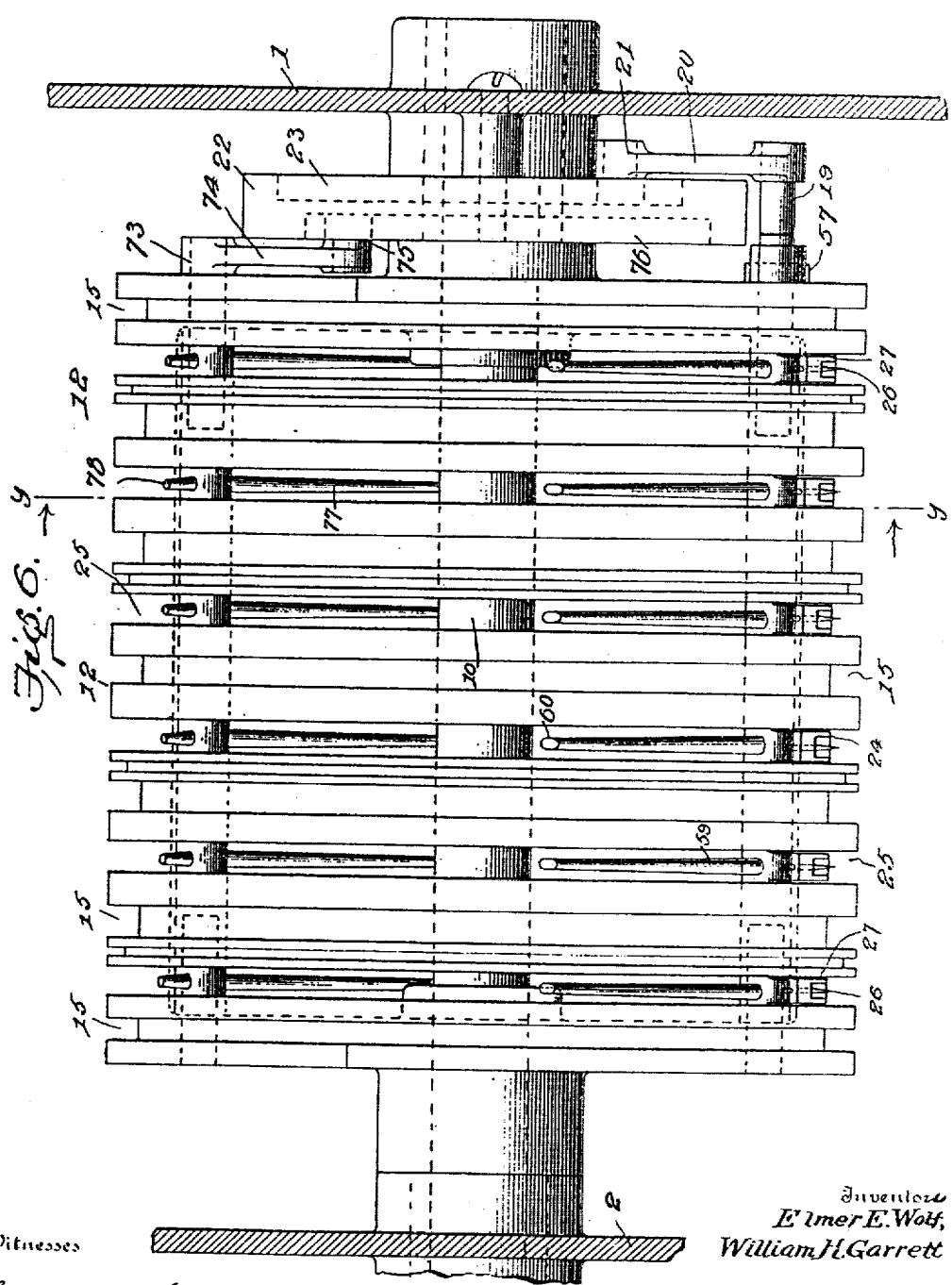
Figure 7:
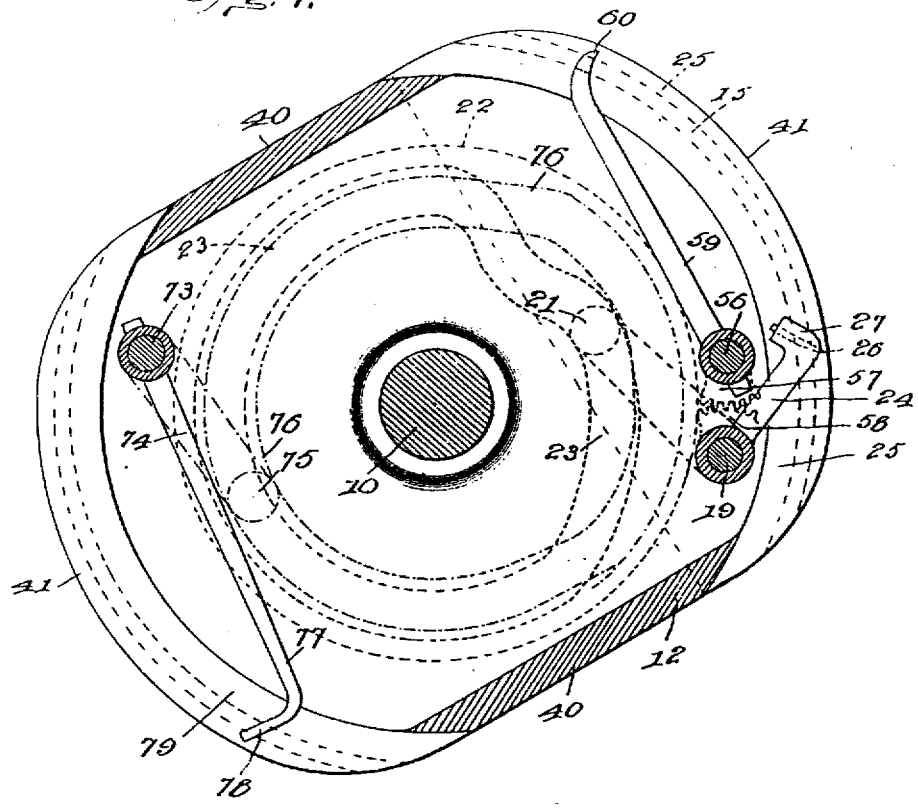
Figure 8:
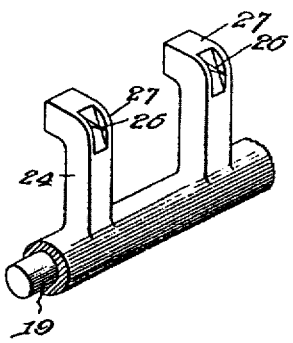

In the accompanying drawings, Figure 1 is a front elevation, partly in section, of a machine embodying our invention in one form. Fig. 2 is a plan view, partly in section. Fig. 3 is an end elevation, on an enlarged scale, the gear-casing being removed. Fig. 4 is a vertical longitudinal sectional view taken on the line *x x* of Fig. 1. Fig. 5 is a diagrammatic view illustrating the operation of the machine. Fig. 6 is a plan view of the feeding-cylinder and its associated parts. Fig. 7 is a sectional view taken on the line *y y* of Fig. 6. Fig. 8 is a detail perspective view of a portion of the needle-arms and their shaft. Fig. 9 is a front elevation of the movable or swinging separating-roll and its associated mechanism. Fig. 10 is an end elevation of what is shown in Fig. 9. Fig. 11 is an end elevation of the swinging pressure device and its operating devices. Fig. 12 is a front elevation of the same. Fig. 13 is a longitudinal sectional view of one of the separating-rolls. Fig. 14 is a similar view of the other separating-roll. Fig. 15 is a sectional view taken on the line *z z* of Fig. 13. Fig. 16 is a sectional view taken on the line *u u* of Fig. 14. Fig. 17 is a longitudinal sectional view of the stripping or retarding roll. Fig. 18 is a perspective view of the front-edge cutter. Fig. 19 is a detail view of the auxiliary needle-points carried by the main frame and also shown in Fig. 11. Fig. 20 is a detail sectional view of the feed-chute, and Fig. 21 is a rear view of the lower part of the machine as indicated by the arrow in Fig. 4.

In the said drawings the frame of the machine is shown as consisting of two upright side members 1 and 2, suitably tied or bolted together. At the rear of this frame there is located a feed-chute 3, in which the letters are placed upright, their lower edges resting on the bottom of the feed-chute and the several letters being arranged in a pack or body, resting against a stop-plate 4 at the lower end of the feed-chute. A weighted pusher 5 slides along the feed-chute and presses the letters down against the stop-plate 4. The feed-chute may be of any suitable construction, but is preferably provided with a bottom composed of antifriction-rollers 6 and a belt or band of fabric 7, resting thereon and on which in turn the letters rest. The pusher or block 5 is attached to the upper end of this fabric, and a weight 8 is attached to the lower end to draw the pusher down upon the letters. The feed-chute is preferably pivotally connected to the main frame of the machine, as indicated at 9, so as to permit its angle to be adjusted as desired.

Within the main frame is mounted a shaft 10, provided at one end with a crank-handle 11 or other suitable means for imparting to it a rotary motion. Within the main frame between the side plates 1 and 2 there is mounted on the shaft 10, so as to rotate therewith, a drum or cylinder 12, which may be termed the "feeding-cylinder," since the main function of said cylinder is the feeding forward of the letters, first to the cutters, by which the envelop is opened, and then to the separating-rolls, by which the envelop and contents are separated. Coöperating with the feeding-cylinder are two sets of guide-rods, between which the letters travel to the point where the cutting operations are completed. The lower set of guide-rods (indicated by the reference-numeral 13) are attached to the frame or to a cross-bar 14 thereof at the rear of the machine below the stop-plate 4. Said guide-rods 13 extend thence from the upper edge of the stop-plate around the upper part of the cylinder 12 to a point adjacent to the front-edge cutter. The cylinder 12 is provided with grooves 15, in which the guide-rods 13 lie. The upper guide-rods are indicated by the reference-numeral 16 and are attached to a cross-bar 17 at the rear upper portion of the machine. Their operative portions begin at a point above the stop-plate 4 and in advance of the stripping-roll, hereinafter referred to, and said guide-rods extend thence around the upper portion of the cylinder 12 a slight distance above the guide-rods 13, so as to leave a space between the guide-surfaces formed by the two sets of guide-rods, in which space the letters travel. The upper guide-rods terminate above the front-edge cutter.

The feeding-cylinder 12 is provided with means for gripping or seizing the end letter of the pack of letters lying in the feed-chute—i. e., the lowermost letter, which rests against the stop-plate 4. To this end the stop-plate is provided with vertical slots 18, and there is mounted in the cylinder 12 a rock-shaft 19, one end of which is extended beyond the end of the cylinder and provided with an arm 20, having a pin or roller 21 at its extremity. A fixed cam-plate 22 is supported from the upright 1 of the frame adjacent to this end of the cylinder 12, and said cam-plate has in its outer face a cam-groove 23, in which the pin 21 travels, said cam-groove being indicated in dotted lines in Fig. 7. A rocking or oscillating movement is thus imparted to the shaft 19 at suitable intervals, and said shaft is provided with needle-arms 24, which may be projected through slots 25 in the cylinder 12, their outer ends being provided with needle-points 26, as shown more particularly in Fig. 8. The arms 24 are provided with lateral flanges 27 on each side of the needle-points 26 to act as strippers to aid in disengaging the needle-points from the letters. As the cylinder 10 rotates the needle-arms are projected therefrom before they reach the stop-plate 4, and when they reach said stop-plate they extend through the slots 18 thereof and engage the lowermost letter of the pack, lifting it upward and carrying it between the guide-rods 13 and 16, said letter at the same time resting on the curved surface or periphery of the cylinder 12. In order to prevent two letters from being thus engaged and carried up at the same time, we employ a stripping or retarding device, located above the stop-plate and consisting of a roll 28, lying adjacent to the cylinder 12 and rotating in the same direction as said cylinder, so that the surfaces of the cylinder and roll, which lie in immediate proximity to each other, move in opposite directions. This stripping-roll is driven at a relatively high rate of speed by the mechanism hereinafter described and is preferably composed of a plurality of disks 29, of rubber, clamped between collars 30 on a sleeve 31, provided at one end with a head 32 and at the other end with a clamping-nut 33. The sleeve 31 is in turn secured in any suitable manner on a shaft 34, mounted in suitable bearings in the main frame and provided at one end with a gear 35, by which said shaft and the roll 28 are driven. The upper guide-rods 16 pass through the spaces between the disks 29, of which the roll 28 is composed. In case a second letter adheres to or follows up the first letter engaged by the needle-arms said second letter will come into contact with the roll 28, which will strip it from the first letter and prevent its passing into the body of the machine along with said first letter. The letter thus guided between the two sets of guide-rods and held on the rotating feed-cylinder, with the needle-arms thereof in engagement with said letter, is carried to the opening mechanism, by means of which the envelop is opened along three of its edges. This opening mechanism preferably consists of cutters which sever the two short lateral edges of the envelop and also one of the longer edges, preferably the front or leading edge, the envelop being carried through the machine with one of its longer edges in advance. The envelop is first carried to the cutters which remove the lateral edges. These cutters are two in number (indicated by the reference-numeral 36) and are in the form of disk cutters mounted on a shaft 37, provided with a gear 38, which meshes with the gear 35 of the stripping-roll, so as to drive said roll. Said gear 38 also meshes with a gear 39 on the shaft 10, by which means the cutters 36 are driven. These cutters lie immediately adjacent to the ends of the cylinder 12, and the ends of the envelop project somewhat beyond the ends of the cylinder, so as to be severed as they pass under the cutters. It will be noticed that the cylinder is flattened or cut away at diametrically opposite points, as indicated at 40, the remainder of its external peripheral surfaces being cylindrical in outline, as indicated at 41. The letter rests upon one of these cylindrically-curved portions of the peripheral surface of the cylinder 12 during this cutting operation and is supported thereby while its ends are being cut off. The clippings arising from the operation of the cutters 36 are discharged upon plates 42, which extend in a downwardly-inclined direction to the front of the machine and form discharge-chutes which receive and carry off the said clippings. The letter is next carried forward by the feed-cylinder to the front-edge cutter. In its preferred form this cutter, which is shown in detail in Fig. 18, consists of a spiral knife 43, mounted on a shaft 44 in suitable bearings at the front of the machine. This shaft is provided at one end with a gear 45, which meshes with an idle gear 46, supported on the frame 1. This idle gear in turn meshes with a gear 47, loosely mounted on the shaft 10 and meshing with a large gear 48, mounted on a shaft 49. This shaft also carries a small gear 50, which rotates in unison with the gear 48 and which meshes with a gear 51, secured on and rotating with the shaft 10. The knife 43 operates in connection with a ledger-plate 52, located immediately below the ends of the guide-rods 13 and 16, said ledger-plate being supported by lugs 53 from one of the cross-bolts 54 of the frame of the machine. This ledger-plate also serves as a convenient means of attachment of the ends of the guide-rods 16. Said plate is also preferably provided with an upwardly-extending guide-plate 55 to guide the advance edge of the envelop into proper cutting position after it has passed beyond the control of the guide-rods. In order to insure the proper positioning of the letter relatively to the cutter 43 and ledger-plate 52, we employ certain positioning devices, which we will now proceed to describe in their preferred form.

Mounted in the cylinder 12 adjacent to and parallel with the shaft 19 is a similar shaft 56, provided with a gear-segment 57, which meshes with a similar gear-segment 58 on the shaft 19. The shaft 56 is provided with pushing-arms 59, adapted to be projected through the slots 25 and terminating in hook-like extremities 60, which are adapted to bear against the rear edge of the letter and force the same forward. The arrangement is such that as the forward edge of the letter approaches the cutter 43 the needle-arms 24 are withdrawn into cylinder 12 and disengaged from the letter, as indicated by the dotted line $a$ in the diagrammatic view Fig. 5. At the same time the pushing-arms 59 are projected from the cylinder 12, their course being indicated by the dot-and-dash line $b$ in Fig. 5, so that they engage the rear edge of the letter and continue to move forward after the needle-arms 24 have been disengaged therefrom. The reason for this is that sometimes a second letter is carried up from the feed-chute as far as the stripping-roll, and when prevented from entering the machine by said roll it remains in an elevated position, so that when the needle-arms 24 engage it at the next revolution of the cylinder they engage it at a point too far back of the forward edge of the letter. If the needle-arms 24 were relied upon to carry the letters around to the front cutter, it is obvious that in a case of this kind the letter would project too far at its forward edge when the needle-arms 24 were finally withdrawn, so that too much of the forward edge would be cut off and the contents of the letter might be mutilated. This is avoided by withdrawing the needle-points before the feeding movement of the letter toward the front-edge cutter is completed. The pushing-arms 59 position the letter with respect to its rear edge, and as soon as the forward edge of the letter has come into proper position the pushing-fingers are withdrawn into the cylinder, as indicated by the dot-and-dash line $b$ in Fig. 5 hereinbefore referred to.

As an additional means for insuring the proper forward feed and holding of the letter with respect to the cutter 43 we employ a plurality of needle-points 61, carried by an oscillating head 62, mounted on a shaft 63, which is in turn mounted in the main frame of the machine. This shaft 63 is located above the cutter 43, parallel therewith, and is provided with an arm 64, which is connected by a link 65 with an arm 66, extending from a rock-shaft 67, mounted in the main frame. One end of this rock-shaft extends beyond the side frame 2, as shown in Fig. 1, and is there provided with an arm 68, having on its free extremity a pin or roller 69, which engages with a cam-groove 70 in the outer face of a cam-wheel 71, secured on the shaft 10. This cam-groove is indicated in Fig. 3 of the drawings, and its construction is such that as the needle-arms 24 are withdrawn the shaft 63 is rocked in such a way as to bring the needle-points 61 down into engagement with the letter. This rocking movement of the shaft 63 continues as long as the pushing-arms 59 are in engagement with the rear edge of the letter. When the forward edge of the letter is in final position to be cut off, the letter is in final position to be cut off, the pushing-arms 59 are withdrawn into the interior of the cylinder 12, and by this time the shaft 63 has moved so far that the needle-points 61 are in full engagement with the letter. Three successive positions of the needle-points 61 are shown in Fig. 5. At this point the letter is stationary between the guide-rods 13 and 16, being held by the needle-points 61, which are stationary during the cutting, and one of the flattened or reduced portions 40 of the cylinder 12 being then passing under it and opposite the cutter 43. This gives room for the cutter to revolve without coming into contact with the cylinder, and the front edge of the letter, which projects a trifle below the ledger-plate 52, is severed by the knife 43. The clippings are discharged upon an inclined plate 72, which forms a chute by means of which said clippings are conducted to a suitable point of discharge at the front of the machine. The envelop has now been opened along three of its edges, but still is a continuous sheet, the front and back being united at the rear edge and the contents being still within the envelop. In this condition it is fed forward to the separating-rolls by the following devices: The shaft 63 resumes its forward movement, and the needle-points 61 advance the letter at the same time that they are gradually withdrawn from engagement therewith. In the cylinder 12 there is mounted at a point about diametrically opposite the rock-shaft 19 a rock-shaft 73, one end of which is extended through the end of the cylinder and is provided with an arm 74, carrying on its free extremity a pin or roller 75, which travels in a cam-groove 76, formed in the inner face of the fixed cam-plate 22. The rock-shaft 73 is provided with pushing-fingers 77, terminating in hook-like extremities 78, which are adapted to be projected through slots 79 in the cylinder 12. After the front edge of the envelop has been cut off in the manner already described the pushing-fingers 77 are projected so as to engage the rear edge of the letter and force it downward toward the separating-rolls. The path of the pushing-arms 77 is indicated by the double dash-and-dot line c in Fig. 5. After completing their feeding motion, which continues after the needle-points 61 have been disengaged, the pushing-arms 77 are again withdrawn into the cylinder. By this means, aided by certain other devices hereinafter referred to, the letter is carried to the separating mechanism, which we will now proceed to describe. In their broadest form these separating devices consist of two contact or working surfaces moving in opposite directions and having different degrees of tenacity. This latter word is used with respect to the holding power or power of engagement which said surfaces exert upon the paper's surface with which they come in contact. In their preferred form they consist of two rolls revolving in the same direction, so that their adjacent surfaces move in opposite direction. One of them is provided with a working surface of superior tenacity, preferably emery-cloth or the like, while the other is provided with a working surface of inferior tenacity, preferably rubber. For purposes of identification we will refer to these rolls hereinafter as the "superior" and "inferior" rolls, respectively. The inferior roll is preferably driven at a higher rate of speed than the superior roll, and provision is made for varying the distance between the rolls, preferably by moving the inferior roll toward and from the superior roll. Referring to the specific embodiment of our invention chosen for purposes of illustration, the superior roll is indicated by the reference-numeral 80 and the inferior roll by the reference-numeral 81. The former is shown in detail in Figs. 14 and 16 of the drawings and comprises a shaft 82, by means of which the roll is driven, and a body portion 83, having grooves 84 to receive the guide-rods hereinafter referred to. The working surface of the roll is composed of a roughened material—such, for instance, as emery-cloth—(indicated at 85.) This roll is driven by means of a gear 86 on its shaft 82, which meshes with a gear 87, mounted loosely on a shaft 88 and meshing with the gear 39. The inferior roll 81 (shown in detail in Figs. 13 and 15) comprises a metal body 90, mounted on a shaft 91 and having a working surface of less tenacity than that of the superior roll. We prefer to employ for this surface rubber, as indicated at 92. The roll 81 is provided with circumferential grooves 93 to receive certain guide-rods hereinafter referred to. The roll 81 is suspended from arms 94, secured at their upper ends on the shaft 88, which is mounted to rock in bearings 95 in the frame. The shaft 91 of said roll is extended through a slot 96 in the side frame 2 and is there supported in a bearing 97 in an arm 98, secured on the shaft 88. 100 indicates a lever mounted loosely on the shaft 88 and provided at its upper end with a cam pin or roller 101, which travels in a cam-groove 102, formed in the inner face of the cam-wheel 71. This cam-groove is indicated in dotted lines in Fig. 3. The other end of the cam-lever 100 (indicated at 103) extends over a flange or projection 104 from the arm 98 and is provided with a bolt 105, which extends loosely through an aperture in the flange or projection 104. The bolt 105 is provided with an adjusting-nut 106 and a lock-nut 107, and a spring 108 is coiled around said bolt, its lower end resting against the nut 106 and its upper end against the under side of the projection 104. By reason of this construction the arm 98 ordinarily moves in unison with the lever 100 and through the rock-shaft 88 and arms 94 swings the roll 81 toward and from the roll 80; but when the roll 81 is pressed upward against some opposing object, such as a letter, with sufficient force it is permitted to yield by the compression of the spring 108. The tension at this point may be readily adjusted by means of an adjusting-nut 106, while a stop-screw 99 provides means for adjusting the limit of upward movement of the roll 81.

The roll 81 is driven by means of a gear 109 on its extended end, said gear meshing with a gear 110, mounted loosely on the shaft 88 and connected with the gear 87, so as to rotate in unison therewith. The gears 110 and 87 are so proportioned that the speed of rotation of the inferior roll 81 is much greater than that of the superior roll 80.

In connection with the separating-rolls we employ a second pair of sets of guide-rods. The guide-rods of the upper set, (indicated by the reference-numeral 111) are supported at their lower ends on a cross-bar 112, their upper ends being free and lying in the grooves 15 of the cylinder 12, so that the letters will pass downward in front of said rods. Said rods extend downward and around the superior roll 80 in the grooves 84, in which they lie, extending thence rearward between the envelop-discharging rolls in the manner hereinafter described. The guide-rods of the lower set, (indicated by the numeral 113) are attached at their rear ends to a cross-bar 114 of the frame and extend thence first between the envelop-discharge rolls and then between the superior and inferior separating-rolls, lying in the grooves 93 of the latter when it is raised.

In order to guide the letter as it descends from the front-edge cutter in front of the guide-rods 111, so as to hold it against said guide-rods and press it against and into engagement with the roll 80, we employ an oscillating presser device consisting of resilient rods 116, mounted at their upper ends on a rock-shaft 117, which is oscillated by means of a link 118, the upper end of which is pivoted to a projection 119 from the arm 68, while its lower end is pivoted to an arm 120 on the rock-shaft 117. This presser device may also comprise a presser-roll 121, mounted to rotate in arms 122, projecting from the rock-shaft 117, said presser-roll being provided with circumferential grooves 123 to receive the rods 116. The movements of this presser device are so timed that as the letter moves downward from the front-edge cutter under the influence of the pushing-arms 77, said presser device moves toward the roll 80 and the upper ends of the guide-rods 111 and holds the letters against said rods and in engagement with said roll until the letter is moved into a position to be grasped between the separating-rolls. The inferior roll 81 is then moved up, so that the letter is grasped between the rolls 80 and 81, and the presser device then swings outward to make room for the movements of the envelop during the separating operation and to permit the free discharge of the contents at the front of the machine.

At the rear of the separating-rolls are located the envelop-discharge rolls. the upper one of which, 124, is mounted in fixed bearings and positively driven by a gear 125, meshing with the gear 87. The other discharge-roll, 126, is mounted to rotate freely in arms 127, which are forced toward the roll 124 by springs 128. The guide-rods 111 and 113 extend from the separating-rolls to these discharge-rolls and between them in grooves 115, the rods 111 and 113 lying in the grooves of the upper and lower rolls, respectively. In describing the operation of this part of the mechanism we shall refer to that side of the envelop which has heretofore been in contact with the cylinder 12 as the "back" of the envelop, the other side being referred to as the "front." Bearing in mind that the envelop engages between the separating-rolls with its advance edge and lateral margins or ends opened or cut, the following action takes place: The back of the envelop is pressed firmly against the superior roll and being held by its superior tenacity is carried steadily rearward by said roll to the discharge-rolls, being unaffected by the action of the inferior roll. The front of the envelop, on the other hand, is engaged by the inferior roll 81, and is thereby moved outward toward the front of the machine into the form of a bow or loop, as indicated in Fig. 5. The contents of the envelop moves outward toward the front of the machine along with the front of the envelop, and when the severed edge of the front of the envelop has passed out from between the separating-rolls said contents is discharged at the front of the machine into a suitable receptacle. The envelop itself still has its back portion engaged by and moving with the superior roll, and as soon as the contents is discharged from said envelop its rearward movement continues, for the reason that even when gripped between the two rolls the superior tenacity of the superior roll causes it to follow the movement of that roll and not the movement in the opposite direction of the inferior roll. In the meantime the severed edge of the back of the envelop has reached and is grasped between the discharge-rolls 124 and 126, and when the inferior roll drops away from the superior roll these discharge-rolls carry the envelop out of the machine and discharge it at the rear into a suitable receptacle. The higher velocity of the inferior roll is of material advantage, in that it moves the front of the envelop quickly outward and discharges the contents before they can be accidentally carried back far enough to become engaged by the envelop-discharging devices. Moreover, since the contents of the envelop are in the form of smooth sheets of paper, having only smooth bearings on similar sheets of paper constituting the inner surface of the envelop, it is obvious that if the two rolls moved at the same rate of speed there would be no reason for the contents to have any tendency to move in one direction rather than the other; but the higher rate of speed of the inferior roll gives all of the sheets of paper between the two rolls a tendency to move in the direction in which said inferior roll is moving, with the exception of the sheet constituting the back of the envelop, which is engaged with the superior roll and is compelled by its superior tenacity to move along with it. If the contents of the envelop consists of a number of separate sheets, we have found in practice that they will all be discharged at the front of the machine even if the front of the envelop passes outward and forward from between the rolls before the several sheets constituting the contents are also passed outward and forwarded from between the rolls, since any sheets of said contents remaining between the rolls will be successively carried forward and discharged at the front of the machine just as the front of the envelop was carried forward. Of course since the front and back of the envelop are not severed at all four of their edges, but remain united along one edge, said envelop constitutes a single sheet, and when the contents of the envelop has been discharged and the front of the envelop has been thrown out forward from between the separating-rolls said envelop constitutes a single sheet, which is the only sheet between the two separating-rolls, and when there is but a single sheet between said rolls such sheet must move to the rear by reason of the superior tenacity of the roll 80.

As the operation of the machine has been described in detail in connection with the description of the construction of the various mechanisms of which it is composed, the operation of the machine as a whole will be readily understood without any further description. It is sufficient to say that after the feed-chute has been supplied with letters rotation of the shaft 10 by hand or power will result in the passage of the letters one by one through the machine, the envelops being opened, their contents discharged at one point, and the empty envelops discharged at another point. In practice we find that the machine is capable of performing this series of operations at the rate of fourteen thousand letters per hour, and it will thus be seen that a very material saving in time and labor is effected thereby.

We do not wish to be understood as limiting ourselves strictly to the precise details of construction hereinbefore described, and shown in the accompanying drawings, as the same may obviously be modified without departing from the principle of our invention.

Having thus fully described our invention, what we claim as new, and desire to secure by Letters Patent, is—

1. A machine for opening and removing the contents of envelops, comprising means for opening the envelop along three of its edges, means for separating the envelop and its contents and discharging them at separate points, and means for feeding the envelop and its contents first to the opening mechanism and thence to the separating mechanism, substantially as described.

2. In a machine of the character described, mechanism for separating an envelop and its contents, comprising two working surfaces in immediate proximity to each other and traveling in opposite directions, said surfaces being of different tenacity, substantially as described.

3. In a machine of the character described, mechanism for separating an envelop and its contents, comprising two working surfaces traveling in opposite directions, said surfaces being of different tenacity, and means for pressing one of said surfaces toward the other with a yielding pressure, substantially as described.

4. In a machine of the character described, mechanism for separating an envelop and its contents, comprising two working surfaces in immediate proximity to each other and traveling in opposite directions at different speeds, said surfaces being of different tenacity, substantially as described.

5. In a machine of the character described, mechanism for separating an envelop and its contents, comprising two working surfaces traveling in opposite directions and at different speeds, said surfaces being of different tenacity, and means for pressing one of said surfaces toward the other with a yielding pressure, substantially as described.

6. In a machine of the character described, mechanism for separating an envelop and its contents, comprising two working surfaces, one of superior tenacity and traveling in one direction, and the other of inferior tenacity and traveling in the opposite direction at a higher rate of speed, and means for pressing said last-mentioned surface toward the other surface with a yielding pressure, substantially as described.

7. In a machine of the character described, mechanism for separating an envelop and its contents, comprising two parallel rolls revolving in the same direction with their working surfaces in immediate proximity, said surfaces being of different tenacity, substantially as described.

8. In a machine of the character described, mechanism for separating an envelop and its contents, comprising two parallel rolls revolving in the same direction and having working surfaces of different tenacity, and means for pressing one of said rolls toward the other with a yielding pressure, substantially as described.

9. In a machine of the character described, mechanism for separating an envelop and its contents, comprising two parallel rolls revolving in the same direction and at different speeds, with their working surfaces in immediate proximity, said surfaces being of different tenacity, substantially as described.

10. In a machine of the character described, mechanism for separating an envelop and its contents, comprising two parallel rolls revolving in the same direction and at different speeds, said surfaces being of different tenacity, and means for pressing one of said rolls toward the other with a yielding pressure, substantially as described.

11. In a machine of the character described, mechanism for separating an envelop and its contents, comprising two parallel rolls revolving in the same direction with their working surfaces in immediate proximity, the working surface of one roll being roughened and the working surface of the other roll being yielding, substantially as described.

12. In a machine of the character described, mechanism for separating an envelop and its contents, comprising two parallel rolls revolving in the same direction with their working surfaces in immediate proximity, the working surface of one roll being of emery-cloth and the working surface of the other roll being of rubber, substantially as described.

13. In a machine of the character described, mechanism for separating an envelop and its contents, comprising two parallel rolls positively driven in the same direction at different speeds, said rolls having working surfaces of different tenacity, one of said rolls being mounted in fixed bearings, pivoted arms carrying the said second roll, means for moving the same toward and from the first roll, and a spring interposed between said swinging arms and their actuating means, whereby the roll carried by said arms operates with a yielding pressure, substantially as described.

14. In a machine of the character described, mechanism for separating an envelop and its contents, comprising two parallel rolls positively driven in the same direction at different speeds, said rolls having working surfaces of different tenacity, one of said rolls being mounted in fixed bearings, pivoted arms carrying the said second roll, means for moving the same toward and from the first roll, a spring interposed between said swinging arms and their actuating means, whereby the roll carried by said arms operates with a yielding pressure, and means for adjusting the tension of said spring, substantially as described.

15. In a machine of the character described, mechanism for separating an envelop and its contents, comprising two parallel rolls revolving in the same direction with their working surfaces in immediate proximity, said surfaces being of different tenacity, said rolls being provided with circumferential grooves, and guide-rods located on opposite sides of the path of the letter and extending between said rolls in the grooves thereof, substantially as described.

16. In a machine of the character described, mechanism for separating an envelop and its contents, comprising two working surfaces of different tenacity in immediate proximity to each other and traveling in opposite directions, in combination with means located on the discharge side of the roll of superior tenacity for engaging and bearing off the envelop, substantially as described.

17. In a machine of the character described, the combination, with means for separating an envelop and its contents, of envelop off-bearing rolls to receive and positively carry off the envelops, substantially as described.

18. In a machine of the character described, the combination, with circumferential grooved separating-rolls, of similarly-grooved envelop off-bearing rolls, and guide-rods extending from one of said set of rolls to the other and also between the rolls of each set in the grooves thereof, substantially as described.

19. In a machine of the character described, the combination, with circumferential grooved separating-rolls, having working surfaces of different tenacity and positively driven in oposite directions, of envelop off-bearing rolls similarly grooved, one of said off-bearing rolls being positively driven and the other being yieldingly pressed against it, and guide-rods lying on opposite sides of the path of the envelop, extending from one set of rolls to the other, and also between the rolls of each set, lying in the grooves thereof, substantially as described.

20. In a machine of the character described, the combination, with means for separating an envelop and its contents, of mechanism for first opening the envelop along three of its edges, comprising cutters operating at the sides of the path of the letter to sever the lateral edges of the envelop, and a cutter operating across the path of the letter to sever the front or leading edge of the envelop, substantially as described.

21. In a machine of the character described, the combination, with means for separating an envelop and its contents, of mechanism for opening the envelop along three of its edges, comprising cutters operating at the sides of the path of the letter to sever the lateral edges of the envelop, a cutter operating across the path of the letter to sever the front or leading edge of the envelop, and means for feeding the letters successively past said cutters and to the separating-rolls, substantially as described.

22. In a machine of the character described, the combination, with means for separating an envelop and its contents, of mechanism for opening the envelope along three of its edges, comprising cutters operating at the sides of the path of the letter to sever the lateral edges of the envelop, a cutter operating across the path of the letter to sever the front or leading edge of the envelop, and means for feeding the letters successively past said cutters and to the separating-rolls, the said feeding mechanism being inoperative during the operation of the front-edge cutter, substantially as described.

23. In a machine of the character described, the combination, with means for separating an envelop and its contents, of mechanism for first opening the envelop along three of its edges, comprising a continuously-rotating feed-cylinder having engaging devices to engage the letter, disk cutters located at the ends of said cylinder and operating at the sides of the path of the letter to sever the lateral edges of the envelop, a cutter operating across the path of the letter to sever the front or leading edge of the envelop, the cylinder being flattened or reduced in diameter to permit this operation of the front-edge cutter, and means for disengaging the engaging devices of the feed-cylinder to permit the letter to remain stationary during said operation of the front-edge cutter, substantially as described.

24. In a machine of the character described, the combination, with means for separating an envelop and its contents, of mechanism for first opening the envelop along three of its edges, comprising a continuously-rotating feed-cylinder having engaging devices to engage the letter, disk cutters located at the ends of said cylinder and operating at the sides of the path of the letter to sever the lateral edges of the envelop, a cutter operating across the path of the letter to sever the front or leading edge of the envelop, the cylinder being flattened or reduced in diameter to permit this operation of the front-edge cutter, means for disengaging the engaging devices of the feed-cylinder to permit the letter to remain stationary during said operation of the front-edge cutter, and means mounted independently of the cylinder for positively engaging and holding the letter stationary during said operation of the front-edge cutter, substantially as described.

25. In a machine of the character described, the combination, with means for separating an envelop and its contents, of mechanism for first opening the envelop along three of its edges, comprising a continuously-rotating feed-cylinder having engaging devices to engage the letter and provided with circumferential grooves, a set of guide-rods lying in said grooves on one side of the path of the letter, a second set of guide-rods lying on the other side of the path of the letter above said cylinder, disk cutters located at the ends of said cylinder to sever the lateral edges of the envelop, and a cutter operating across the path of the letter to sever the front or leading edge of the envelop, substantially as described.

26. In a machine of the character described, the combination, with a feed-cylinder having engaging devices to engage and release the letters, of a feed-chute supplying the letters successively to said feed-cylinder, guide-rods between which the letters travel, cutters located at the ends of the cylinder to sever the lateral edges of the envelop, a cutter operating across the path of the letter to sever the front or leading edge of the envelop, and separating-rolls which receive the letter after the said three edges have been severed, said rolls having working surfaces of different tenacity and moving in opposite directions, whereby the envelop and its contents are discharged on opposite sides of said rolls, substantially as described.

27. In a machine of the character described, the combination, with a feed-chute having a terminal stop and means for pressing the letters against said stop, of a feed-cylinder having needle-points to engage the letter resting against said stop, and a stripping or retarding device located adjacent to said cylinder at a point of its travel beyond said feed-chute and stop, substantially as described.

28. In a machine of the character described, the combination, with a feed-cylinder and a cutter operating across the path of the letters carried thereby, of a feed-chute for supplying letters to the cylinder and a stripping or retarding device for holding back surplus letters located between the feed-chute and cutter, said cylinder being provided with needle-arms and means for projecting the same through the cylinder to successively engage the letters presented by the feed-chute and carrying them around toward but not to the cutter, positioning-arms also carried by said cylinder, and means for projecting said arms from said cylinder to engage the rear edge of the letter and move the same positively into position relatively to the cutter, substantially as described.

29. In a machine of the character described, the combination, with separating-rolls, a front-edge cutter operating across the path of the letter, a feed-chute for presenting the letters, and a retarding or stripping device between the feed-chute and cutter, of a feeding-cylinder provided with a set of needle-arms and two sets of pushing-arms, and means for projecting and retracting said arms, whereby the needle-arms are first engaged with the letter to carry the same from the feed-chute partly to the cutter, and are then withdrawn from such engagement, the first set of pushing-arms are then projected to engage the rear edge of the letter and move the same in proper position relatively to the cutter, said first set of pushing-arms being then withdrawn from such engagement, and, finally the second set of pushing-arms are projected, after the cutter has operated, to move the letter forward and deliver it to the separating-rolls, substantially as described.

30. In a machine of the character described, the combination, with a cutter operating across the path of the letter, of a continuously-rotating feed-cylinder provided with two sets of pushing-arms, one set operating to push the letter into position to be cut, and the other set operating to push the letter forward after the cutting, guide-rods to support the letter in its travel and an auxiliary feeding and holding device mounted on the main frame independently of the cylinder and comprising a rock-shaft provided with needle-points to engage the letter, and means for imparting to said rock-shaft and needle-points an intermittent oscillating movement of advance, whereby said needle-points engage and move along with the letter during the action of the first pushing-arms, remain stationary to hold the letter during the cutting, and then advance along with and are disengaged from the letter during the operation of the second set of pushing-arms, substantially as described.

31. In a machine of the character described, the combination, with feed mechanism for feeding forward the letter, and a cutter for severing the forward edge thereof, of separating-rolls, of a presser device for pressing the letter against one of said separating-rolls after it leaves the cutter, substantially as described.

32. In a machine of the character described, the combination, with feed mechanism for feeding forward the letter, and a cutter for severing the forward edge thereof, of separating-rolls, of a presser device for pressing the letter against one of said separating-rolls after it leaves the cutter, said presser device comprising a plurality of resilient rods, substantially as described.

33. In a machine of the character described, the combination, with feed mechanism for feeding forward the letter, and a cutter for severing the forward edge thereof, of separating-rolls, of a presser device for pressing the letter against one of said separating-rolls after it leaves the cutter, said presser device comprising a grooved presser-roll and a plurality of resilient rods, substantially as described.

34. In a machine of the character described, the combination, with feeding mechanism and a cutter for severing the front edge of the letter, of separating-rolls, a presser device for pressing the letter against one of said separating-rolls after it leaves the cutter, and means for moving said presser device toward and from the separating-rolls, substantially as described.

35. In a machine of the character described, feed mechanism and a cutter for severing the front edge of the letter, in combination with separating-rolls, fixed guide-rods extending from the cutter to the separating-rolls on one side of the path of the letter, and a presser device comprising a plurality of resilient rods lying on the opposite side of the path of the letter, and adapted to press the letter against the fixed guide-rods and one of the separating-rolls, and means for moving said presser device toward and from the fixed guide-rods and separating-rolls, substantially as described.

36. A mechanism for opening letters, comprising means for feeding forward the letters, cutters operating at the sides of the path of the letters to sever the lateral edges of the envelop, and a cutter operating across the path of the letter to sever one of the transverse edges of the envelop, substantially as described.

37. Mechanism for opening letters, comprising means for intermittently and successively feeding forward the letters, cutters operating at the sides of the path of the letters to sever the lateral edges of the envelop, and a cutter operating across the path of the letter while the letter is stationary to sever one of the transverse edges of the envelop, substantially as described.

38. Mechanism for opening letters, comprising a continuously-rotating feed-cylinder having devices to engage the letter, disk cutters located at the ends of said cylinder and operating at the sides of the path of the letter to sever the lateral edges of the envelop, a cutter operating across the path of the letter to sever one of the transverse edges of the envelop, and means for disengaging the engaging devices of the feeding-cylinder to permit the letter to remain stationary during the operation of the last-mentioned cutter, substantially as described.

39. Mechanism for opening letters, comprising means for feeding forward the letters, cutters operating at the sides of the path of the letters to sever the lateral edges of the envelops, a cutter operating across the path of the letter to sever one of the transverse edges of the envelop, and means for positioning said transverse edge relatively to the last-mentioned cutter, substantially as described.

In testimony whereof we affix our signatures in presence of two witnesses.

ELMER E. WOLF.
WILLIAM H. GARRETT.

Witnesses:
E. O. HAGAN,
IRVINE MILLER.